United States Patent
Nordgård

[11] Patent Number: 5,993,355
[45] Date of Patent: Nov. 30, 1999

[54] CONTROL SYSTEM FOR AN AUTOMATICALLY ACTUATED CLUTCH

[75] Inventor: Knut Nordgård, Darbu, Norway

[73] Assignee: Kongsberg Techmatic UK Limited, Warwickshire, United Kingdom

[21] Appl. No.: 08/809,748

[22] PCT Filed: Sep. 22, 1995

[86] PCT No.: PCT/IB95/00785

§ 371 Date: Oct. 17, 1997

§ 102(e) Date: Oct. 17, 1997

[87] PCT Pub. No.: WO96/09184

PCT Pub. Date: Mar. 28, 1996

[30] Foreign Application Priority Data

Sep. 23, 1994 [DE] Germany ............... 44 34 111

[51] Int. Cl.⁶ .................................................. B60K 41/02
[52] U.S. Cl. ............... 477/174; 477/175; 74/335
[58] Field of Search ........................ 477/118, 166, 477/174, 175; 74/335, 336 R

[56] References Cited

U.S. PATENT DOCUMENTS

| | | | |
|---|---|---|---|
| 4,825,993 | 5/1989 | Kurihara et al. | 477/80 |
| 5,275,267 | 1/1994 | Slicker | 192/103 R X |
| 5,293,316 | 3/1994 | Slicker | 74/866 X |
| 5,314,050 | 5/1994 | Slicker et al. | 477/171 |
| 5,316,116 | 5/1994 | Slicker et al. | 477/181 |
| 5,337,868 | 8/1994 | Slicker et al. | 477/74 |
| 5,378,211 | 1/1995 | Slicker et al. | 477/180 X |
| 5,393,274 | 2/1995 | Smedley | 477/74 |
| 5,439,428 | 8/1995 | Slicker | 477/175 |
| 5,681,242 | 10/1997 | Bates | 477/180 |

FOREIGN PATENT DOCUMENTS

| | | |
|---|---|---|
| 0 601 729 | 6/1994 | European Pat. Off. . |
| 40 11 850 A1 | 10/1990 | Germany . |
| WO 92/13208 | 8/1992 | WIPO . |

*Primary Examiner*—Charles A. Marmor
*Assistant Examiner*—Ha Ho
*Attorney, Agent, or Firm*—Darby & Darby

[57] ABSTRACT

An automatically operated clutch (3) between a motor vehicles engine (2) and gearbox (4) is moved by a hydraulic actuator (8), which acts on the clutch release, from a fully disengaged position through positions in which clutch slip occurs into a fully engaged position. A point of contact on the clutch at which transmission of engine torque begins is determined and the corresponding position of the actuator (8) stored. In the region above the contact point within which no torque is transmitted, the position of the actuator is adjusted by a position control circuit (70), while in the region below the contact point in which torque is transmitted, an engine speed control circuit (78) is superimposed on the actuator position control circuit. The engine speed at the point of contact is adjusted to a figure somewhat (approx. 50 rpm) above the speed of the clutch (output) shaft. The actuator (8) is adjusted to the position corresponding to the contact point by the position control circuit (70) on which the speed control circuit (78) is superimposed.

8 Claims, 5 Drawing Sheets

*Fig. 8* ated clutch in accordance with the preamble to
CONTROL SYSTEM FOR AN AUTOMATICALLY ACTUATED CLUTCH The invention relates to a control system for an automatically actuated clutch in accordance with the preamble to claim 1. By means of the clutch, the engine torque of a motor vehicle is transmitted to the gearbox or the force path between the engine and the gearbox is interrupted. When driving away, the torque causes a continuous increase of the speed. In this case, the torque transmission takes place with the clutch slipping, i.e. with a speed difference between the output shaft of the engine and the input shaft of the gearbox. Torque is also transmitted with clutch slip in other driving conditions—to avoid oscillations in the drive train of the motor vehicle, for example.

In conventional motor vehicles, the clutch is actuated by the driver via the clutch pedal, i.e. it is disengaged and engaged. Automatically actuated clutches have been developed, in order to facilitate the operation of a motor vehicle, to ease the load on the driver and to make it possible for him to pay more attention to the road traffic.

A known device controls an automatic friction clutch during an operating condition such as driving away, gear-changing, etc. or during transitions between the operating conditions (DE-A 40 11 850, U.S. Pat. No. 5,176,234). A clutch control intervention point for driving away is determined as a function of a torque measurement or angle measurement in the drive train. With a gear engaged and the vehicle at rest, the clutch is closed from its disengaged position at a defined speed as far as a position in which engine torque is transmitted, but in which its torque is not sufficient to move the motor vehicle. A value on reaching a specified torque or angle, for example the location of the clutch actuation, is determined and stored and the clutch is subsequently reopened partially and brought into a so-called waiting position.

Automatically actuated clutches provide a level of driving comfort which is comparable with that of an automatic gearbox, but require substantially less outlay and result in a lower weight. In some driving situations, they have additional advantages relative to automatic gearboxes.

In order to be able to engage a clutch gently and without jolts, on the one hand, but to avoid slip for an excessively long period, which would lead to unnecessary wear of the clutch lining, the engagement point of the clutch must be accurately maintained. In fact, however, it changes as a function of various influences and depends, in particular, on temperature and wear.

The object of the invention is to create a control system for an automatic clutch by means of which compensation can be provided for the various factors influencing the engagement behaviour of the clutch.

This object is achieved in the invention by means of the control system in accordance with claim 1.

Useful further developments of the invention are given in the dependent claims.

The advantages of the invention lie particularly in the fact that the driver only has to use the accelerator pedal to control the drive torque. This, in particular, facilitates driving on a smooth surface and parking manoeuvres in restricted space conditions. The life of the clutch is increased. The clutch actuation adapts itself to the driving style of the driver, whether this is more in the direction of economy or more in the direction of performance. Clutch grab or jolt or, indeed, engine stall due to inaccurate clutch actuation are completely avoided. On the other hand, gear-changing is left to the driver. The need for this is also the result of the driver recently again being allowed a free selection of gear by additional measures taken in the case of upper-range high-performance vehicles with an automatic gearbox. When a faulty clutch, for instance from a very high to a very low speed, causes a known extremely high clutch speed (from above ca 12000 rpm), the control system according to the invention prevents racing of the engine, jolting and oscillations in the drive train can also, therefore, be effectively prevented and the associated development of noise within the vehicle when travelling slowly in a high gear disappears. Because excessive engine acceleration is prevented by the clutch control system and the fuel consumption is reduced, the burden on the environment due to the motor vehicle is reduced.

An essential aspect of the invention is an engagement point (which is designated here as the "touch-point"), offers the driver of the vehicle the possibility of a very comfortable control of the clutch setting and which is continually updated.

An exemplary embodiment of the invention is explained below using the drawing. In this.

A diagrammatically represented motor vehicle drive 1 (FIG. 1) has an engine 2, a clutch 3, a gearbox 4 and a propeller shaft 6 which leads to an axle drive (not shown here) of the motor vehicle. The clutch 3 is actuated by a hydraulic actuator 8 whose axial position is recorded by a position sensor or position pick-up 9. The actuator 8 is driven by a hydraulic pressure supply unit 11, which has an integrated proportional valve 12 and is connected to an oil reservoir 14. The hydraulic conduits (without reference numerals) between the actuator 8, the pressure supply unit 11 and the oil reservoir 12 are represented by thick lines whereas the various signal lines which can be seen in the drawing are indicated by fine lines.

Figure 1:
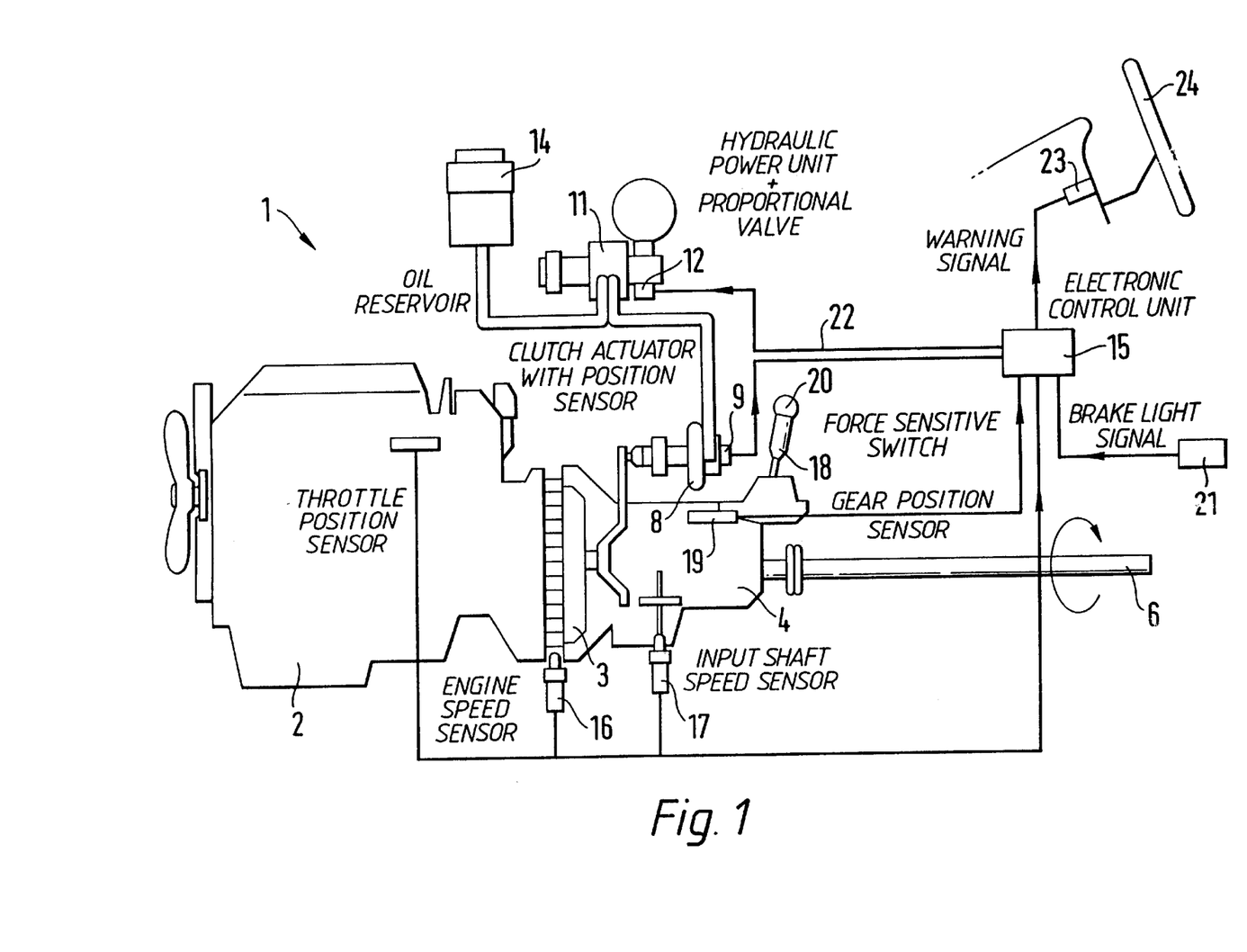
FIG. 1 shows, in diagrammatic representation, the essential drive parts and operating parts of a motor vehicle provided with an automatic clutch control system according to the invention.

An electronic control unit 15 receives a plurality of sensor signals—from an engine speed sensor 16, from a gearbox input shaft speed sensor 17, from a gear lever position sensor 20 connected to a gear lever 18, from the position sensor 9 of the hydraulic actuator 8 and from a brake-light switch 21. The control unit 15 processes these signals in a manner still to be described and generates a control signal which is transmitted via a line 22 to the proportional valve 12. The latter controls the supply of hydraulic oil under pressure to the hydraulic actuator 8 and therefore controls the position of the clutch 3. Details of this are explained further below.

In the event of a fault, for example excessive wear of the clutch linings, the control unit 15 sends a warning signal to a warning lamp 23 which is mounted on the dashboard of the motor vehicle near the steering wheel 24, and is therefore easily visible to the driver.

Figure 2:
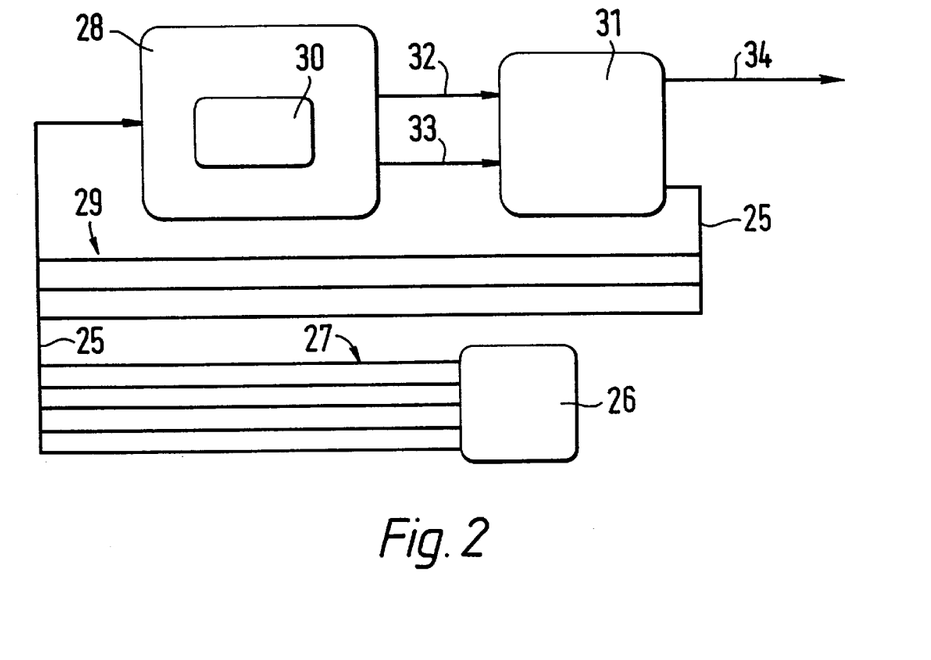
FIG. 2 shows a subdivision into modules of the constituent parts of the control system of FIG. 1.

The systematic subdivision, shown in FIG. 2, of the control system constituent parts into modules, which are connected by diagrammatically represented signal and data lines 25 to one another and to the already-mentioned sensors in the motor vehicle, is also used to explain the mode of operation of the clutch control system according to the invention. These sensors are here collected into a sensor module 26. Via lines 27, the sensors send signals to an electronic module 28 which reproduce the following parameters (from top to bottom): the engine speed, the clutch speed, which corresponds to the input shaft speed of the gearbox, the gear lever position, the brake actuation and the position of the throttle butterfly. Signals referring to the oil level in the oil reservoir 14, the hydraulic working pressure and the position of the clutch 3 reach the electronic module 28 via further signal and data lines 29.

The electronic module includes a program or software module 30 which contains the software for the control unit 15. A hydraulic module 31 is connected to the electronic module 28 by the signal and data lines 29, on the one hand, and by a supply line 32 and a control line 33, on the other. A pump belonging to the hydraulic pressure supply unit 11 is supplied with electric current via the supply line 32. The hydraulic module 31 is supplied, via the control line 33, with an electric current which is proportional to the axial setting speed of the clutch. The hydraulic module 31 transmits a setting signal for the clutch via a line 34.

A diagrammatically represented clutch 36 (FIG. 3) consists essentially of the friction surface of a flywheel 37 of the engine, of a pressure plate 39, of a diaphragm spring 39, which is pivotably supported on edges 40, a disengagement unit or disengagement bearing 41, which is displaced axially by a disengagement fork 42. A clutch disc 43, on which clutch linings are fastened in known manner, is arranged between the flywheel 37 and the pressure plate 38.

Figure 3:
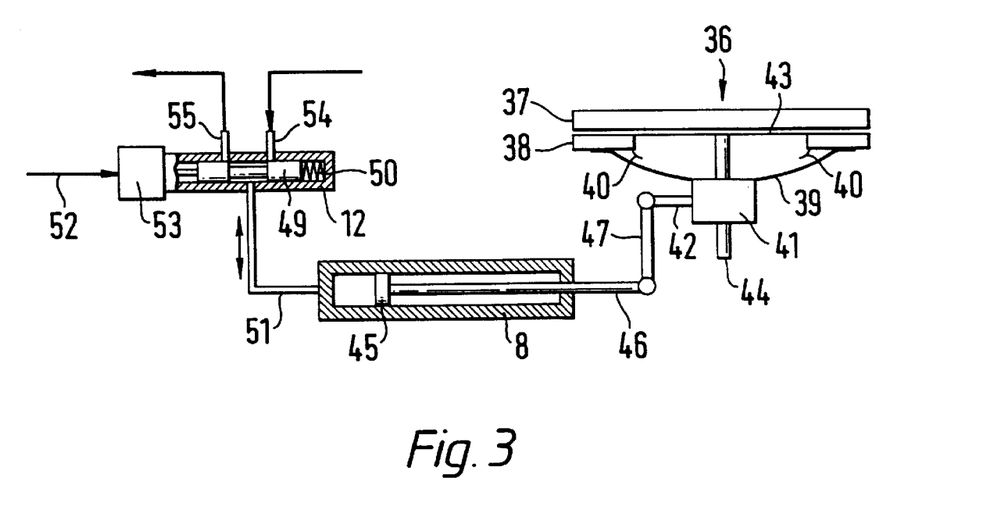
FIG. 3 shows an actuator drive for actuating a clutch.

The clutch 36 is actuated by the hydraulic actuator 8. In the position represented in the drawing, the pressure plate 38 is pressed by the diaphragm spring 39 against the flywheel 37. The clutch disc 43 is then driven by friction and transmits the rotary motion of the flywheel 37 to an input shaft 44 of the gearbox.

If a piston 45, which is displaceable in the actuator 8, is displaced to the right by the working pressure of the hydraulic oil, the piston rod 46 then pivots the disengagement fork 42 upwards, the latter being provided with a lever 47 arranged at right angles. The diaphragm spring 39 is then pivoted on the edge 40 and raises the pressure plate 38 from the clutch plate 43 so that the force path is interrupted between the engine and the gearbox of the motor vehicle.

Hydraulic oil under pressure is supplied to and drained from the actuator 8 under the control of the proportional valve 12. The latter contains an axially movable spool 49 which is held in equilibrium by a spring 50. An electromagnet 53, which is supplied with electric current via a line 52, moves the spool 49 against the action of the spring 50 and connects—by means of recesses present on it—the internal space of the actuator 8 either to a pressure conduit 54, via which hydraulic oil under pressure is supplied, or to a drain conduit 55, via which the hydraulic oil can drain into the oil reservoir 14. The control valve 12 is designated as a proportional valve, as the free flow cross section of the valve for the oil through-flow, is proportional to the electric current flowing through the electromagnet 53. Given a constant pressure difference of the openings in the valve ports, this will result in a hydraulic oil flow to the control valve proportional to the electric current flowing through the electromagnets. Hence the speed of the piston rod 44 is controlled by the current flowing through the electromagnets 53.

The torque transmitted by the clutch has to be controlled by the control system described here. This is achieved by controlling the axial position of the clutch disengagement unit 41 because the torque transmitted has a defined functional relationship with the position of the disengagement unit 41 due to the characteristics of the diaphragm spring 39. A drive cylinder of a known hydraulic clutch actuation unit can be used as the actuator 8. A pressure reservoir contained in the hydraulic pressure supply unit has a reserve of hydraulic pressure which is sufficient to cover the peak requirement of the actuator 8. In intermediate positions of the actuator, the pressurized oil requirement is determined only by the small leakage flow of the proportional valve 12.

In order to control the clutch torque, the clutch position, and therefore the position of the piston 45 and the piston rod 46 of the hydraulic actuator 8, must be controlled. This control is carried out by means of a first closed-loop control circuit—an electric current control circuit—58 (FIG. 4), which controls the current flowing through the electromagnet 53. The input parameters for this closed-loop control circuit are a required position value specified by means of an input line 59 and an actual position value of the actuator 8, which is supplied by the position pick-up 9, for example a potentiometer, and which is fed back to the input of the control circuit via a feedback line 60. The generation of the required position value is explained further below.

Figure 4:
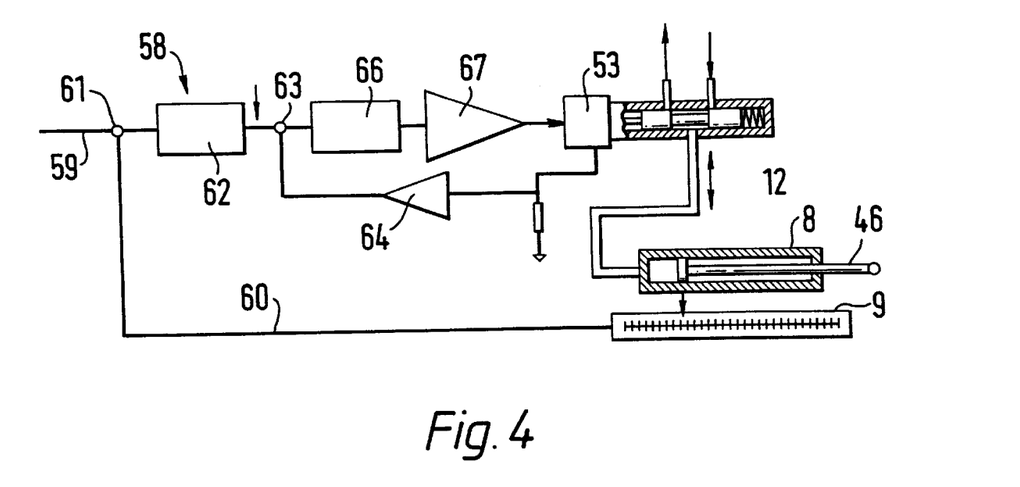
FIG. 4 shows a general view of the actuator drive of FIG. 3 and the associated control circuit.

A position controller 62 generates a required electric current value using the control deviation between the actual position value and the required position value formed in a summation point 61 and this required electric current value is supplied to a summation point 63. In the latter, the control deviation relative to the actual electric current value fed back from the electromagnet via a measuring amplifier 64 is generated and supplied to an electric current controller 66. The output signal of the electric current controller 66 passes via an amplifier 67 as a setting parameter to the input of the electromagnet 53. The summation point 61 may also be implemented in form of a software command which calculates the set point deviation. The position controller 62 may for instance be revised as a according to known control theories carefully drafted control algorithm, which generates the set value for the electric current through the electromagnets 53. The current controller is similarly carefully drafted according to known control theories, but realized in hard-wired electronics. Its output signal controls the amplifier 67 which is used as driver for the current to the electromagnets 53.

In order to control the torque transmitted in the various operating conditions in which slip occurs in the clutch, it is necessary to supplement the control circuit described above (see FIG. 5). As an introduction, the considerations on which the extended control is based are now explained. They are based on an analysis of the interactions between the driver, the engine, the clutch and the driving comfort of a motor vehicle.

In a motor vehicle gearbox with manual gear change, the driver directly controls the torque to be transmitted by the clutch by means of the clutch pedal, on the one hand, and the torque to be generated by the engine by means of the accelerator pedal, on the other.

One of the capabilities which is most difficult for a driving beginner to acquire is the co-ordination of the actuation of these two pedals. At the beginning, he will either accelerate the engine excessively, which leads to increased wear of the clutch linings, or he will engage the clutch too rapidly, which leads to unpleasant jolting of the vehicle or even to the engine stalling. An experienced driver, on the other hand, will co-ordinate the actuation or the two pedals in such a way that the torque transmitted by the clutch corresponds approximately to the torque generated by the engine. This means that the engine speed is kept approximately constant. If the driver desires a more rapid acceleration of the vehicle, the torque transmitted by the clutch and simultaneously the engine torque must be increased. This is achieved by increasing the throttle butterfly angle and by balancing the torque at a higher engine speed by adjusting the clutch accordingly.

In the automatic clutch system described here, the driver no longer controls the clutch; he simply controls the torque to be generated by the engine by actuating the accelerator pedal. As a result, the clutch control system must, in turn, maintain equilibrium between the torque to be transmitted and the torque generated. If this is successfully achieved, it follows that the driver controls the torque transmitted to the driving wheels of the motor vehicle by means of the accelerator pedal.

It follows from this that the problem of keeping the torque in equilibrium corresponds to the problem of controlling the engine speed. In this case, the clutch, whose position control has been described above, is the element which has to be controlled.

Figure 5:
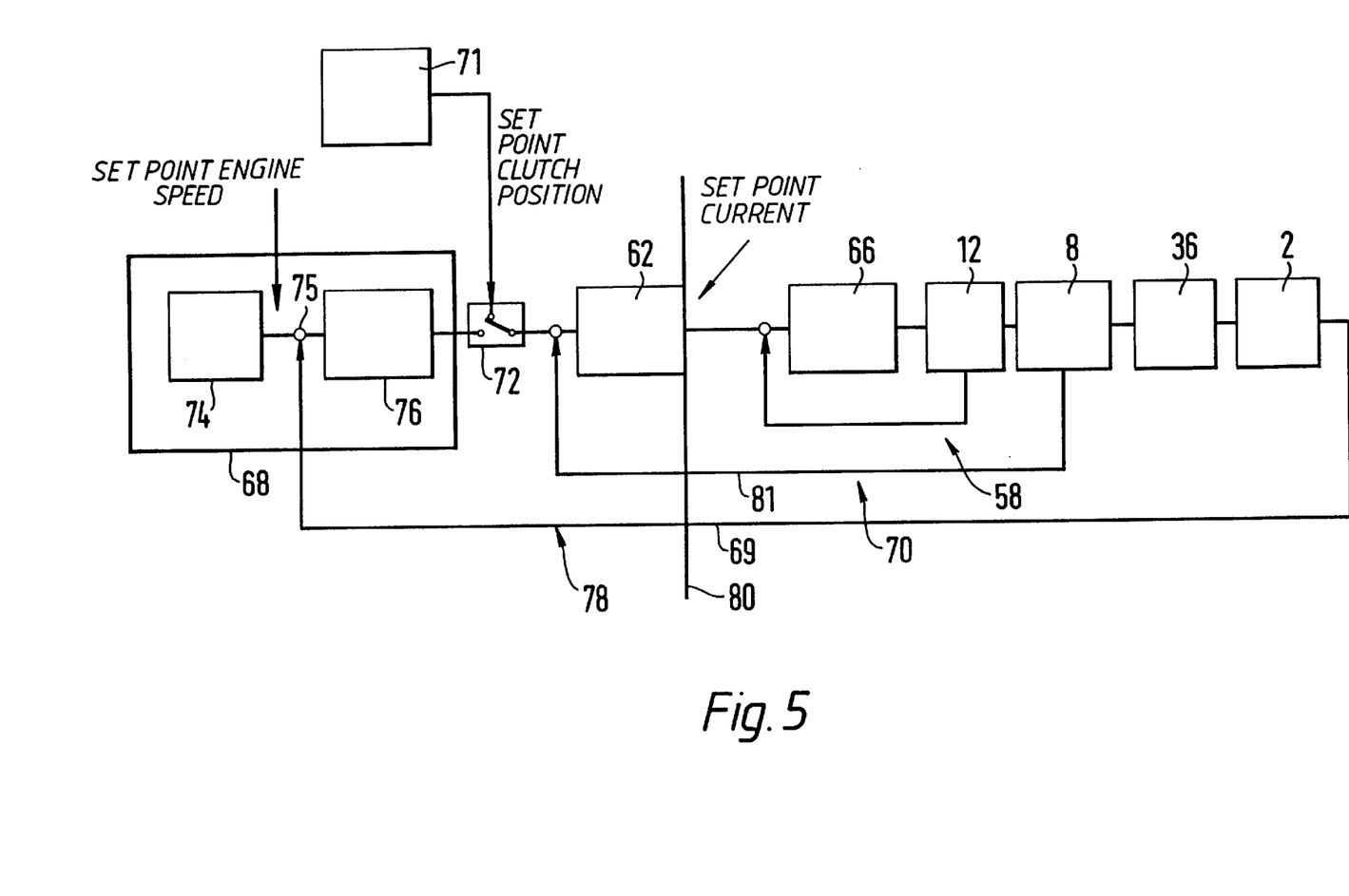
FIG. 5 shows control circuits of the clutch control system of FIG. 1.

The extended multiple closed-loop control circuit, shown in FIG. 5, contains a first control circuit or speed control unit 68, a second closed-loop position control circuit 70, which is superimposed on the closed-loop electric current control circuit 58, and a second open-loop control circuit 71. In other words, second closed-loop electric current control circuit 58 is included in second open-loop control circuit 70. It has two different modes or types of operation: a first mode without clutch slip and a second mode with clutch slip. In the first mode, an actual position value for the clutch is generated in the second open-loop control circuit 71 and this is supplied to the input of the second superimposed closed-loop control circuit 70 via a change-over switch 72. In the second mode, a required engine speed value is generated in a third open-loop control circuit 74, which contains a characteristic diagram for example, and is supplied to the input of an engine speed control unit 76 via a summation point 75.

The actual speed of the engine 2 reaches the summation point 75 via a feedback line 69 and there provides the control deviation for the engine speed control unit 76 as the difference relative to the required speed value. This engine speed control unit 76 is therefore a constituent part of a third closed-loop control circuit 78, which is superimposed on the closed-loop position control circuit 70, and it may, depending on the driving mode, be configured as a P, PI or PD controller. In case of a PI controller the P part (proportional part) of the control unit drives the clutch actuator 8 into a position whose deviation relative to the touch point is proportional to the difference between the engine speed and its required value. It follows from this that the clutch is brought more strongly into engagement with increasing engine speed. The I part (integral part) of the controller 76 drives the clutch actuator 8 into a position whose deviation relative to the touch point is proportional to the integral with time of the difference between the engine speed and its required value. It follows from this that the clutch is continually brought more strongly into engagement when the engine speed is above its required value until such time as the deviation has been annulled.

The required speed values for the engine are generated as follows, depending on the mode of operation of the clutch control:
1. No slip in the clutch:
    The clutch is completely engaged and the required value for the engine speed is specified by the accelerator pedal alone.
2. Driving off from zero speed:
    This mode of operation is characterized by a large amount of slip, i.e. by a large difference between the engine speed and the clutch speed. The required engine speed value depends on how strongly the driver depresses the accelerator pedal. Stated more accurately: the required engine speed value must be slightly above the idling speed at small throttle butterfly angle. The required engine speed value must subsequently increase as a function of the throttle butterfly angle and, specifically, until a saturation value is reached at which the engine delivers its maximum torque.
3. Driving with slip:
    This mode is characterized by the vehicle being driven at a speed which—for the currently selected gear—is within the permissible speed range of the engine. By setting the required value of the engine speed (with the control circuit 74, cf. FIG. 5) slightly (approx. 50 rpm) above the clutch (output) speed, the control system can maintain a slip of this magnitude in the clutch. The required engine speed value is therefore fixed by the clutch speed with a deviation (a so-called offset) of 50 rpm.

A throttle butterfly sensor is, of course, required in the second mode of operation.

In this uncertainty range, the control system will always activate a (clutch) slip control unit. If the polarity of the activated slip control unit in this range is incorrect or gradually becomes incorrect, the control unit will integrate the clutch beyond the existing zero torque limit previously mentioned. If this takes place gradually, i.e. with small dynamics, the zero torque limit can be updated. The limit, and consequently the position of the uncertainty range also, can therefore be adapted to the respective condition of the vehicle and, specifically, over the complete life of the motor vehicle.

The program worked out for this purpose is reproduced in pseudocode below.

---

If small dynamics
    If positive torque controller active
        If clutch position set point is greater than almost zero torque
           (i.e. integrated out)
                Update the "zero torque limit" with the current throttle
                angle and engine speed.
                Keep the clutch position at zero torque level.
                Switch to the negative torque controller.
    else (negative torque controller active)
        If clutch position set point is greater than almost zero torque level
           (i.e. integrated out.)
                Update the "zero torque limit" with the current throttle
                angle and engine speed.
                Keep the clutch position at the zero torque level.
                Switch to the positive torque controller.

---

No slip takes place in the clutch when it has to transmit absolutely no torque or the maximum torque, i.e. if it is completely disengaged or completely engaged. It is characteristic of these conditions that the automatic clutch control should not and cannot control the engine speed in them. These conditions occur:
    at idle when changing gear
when the clutch is fully engaged.

The change-over switch 72 is required for these operating conditions. The speed control unit control system 68 is inactivated in this case and the necessary clutch position is no longer fixed by the engine speed controller 76.

An interrupted line 80 in FIG. 5 signifies a subdivision, carried out in an exemplary embodiment, of the individual functions of the automatic clutch control system. The functions represented to the left of it are in software, i.e. are realized by programs, and the functions represented to the right of it are realized by hardware, i.e. electrical circuits and mechanical elements. In the case of a fully-engaged clutch, the feedback line 69 and a further feedback line 81 are made inactive. i.e. no signals are transmitted through them, or the signals may be transmitted through, but ignored by the computer software. In this condition, the electric current control unit 66 over the amplifier 67 on the proportional valve supplies only a holding current (with a current strength reduced to approximately one quarter), which on one hand causes the proportional valve to a open towards the oil reservoir, i.e. the actuator 8 is without pressure. On the other hand the holding current enables the system to disengage the clutch enough to avoid engine stalling in case a panic braking should occur.

Figure 6:
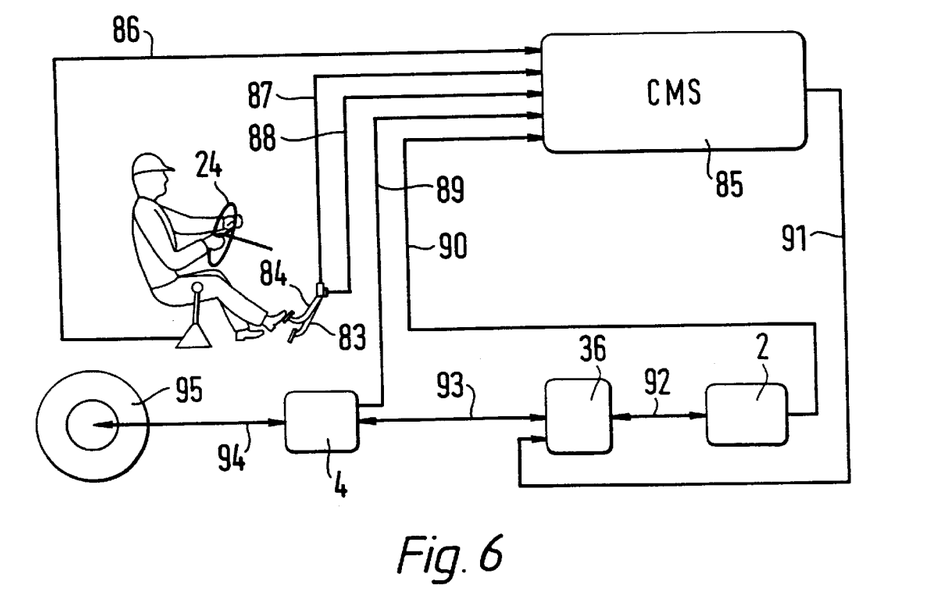
FIG. 6 shows a general view of the drive train and the operating elements of a motor vehicle with a clutch control system as shown in FIG. 1, together with the sensor signals used in it.

In a motor vehicle provided with the control system described here (FIG. 6), the driver operates the gear lever 18, the steering wheel 24, an accelerator pedal 83 and a brake pedal 84. Corresponding sensor signals reach the automatic clutch control system 85 (CMS=Clutch Management System) via the following signal lines: the gear lever position via 86, the brake actuation via 87 and the throttle butterfly position via 88. From the gearbox 4 and the engine 2, the clutch speed reaches an automatic clutch control system 85 via a signal line 89 and the engine speed reaches it via a signal line 90. This clutch control system 85 corresponds to the control system according to the invention. From this clutch control system, the setting signal reaches the clutch 36 via a signal line 91. The torque from the engine 2 reaches the axle drive of the motor vehicle indicated by a wheel 95 via the clutch 36 and the gearbox 4 and via the drive train 92, 93 and 94. The arrows pointing in both directions on the drive train indicate that the direction of torque transmission can be reversed.

Figure 7:
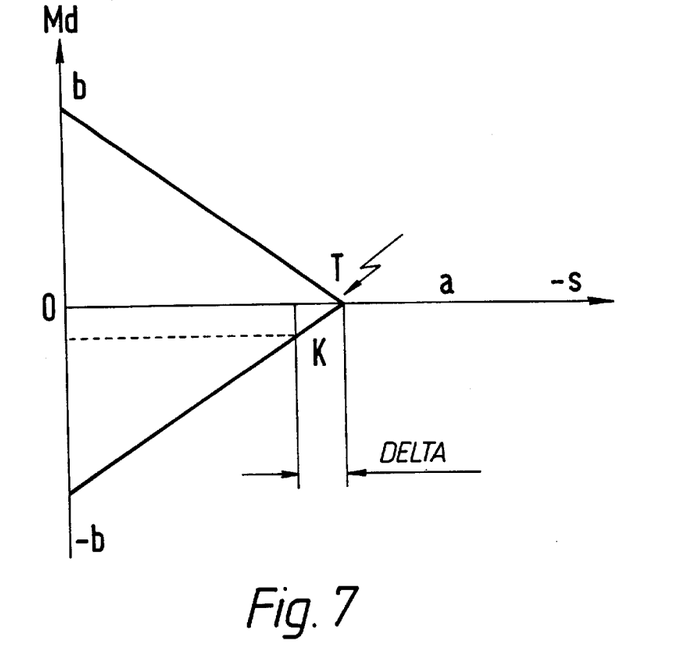
FIG. 7 shows a diagram for explaining the touch point of the clutch.

The torque transmission with the clutch slipping, i.e. in the case of a speed difference between the input and output shafts of the clutch, is explained using FIG. 7. The position −s (with a negative sign because, in this representation, the displacement of the clutch on engagement takes place to the left) of the disengagement unit or the clutch is plotted as the abscissa and the torque transmitted $M_d$ is plotted as the ordinate. Above the abscissa, the torque transmitted is positive and the engine drives the motor vehicle. Below the abscissa, it is negative and the engine retards the vehicle (possibly with overrun cut-off).

In an initial position a, the clutch is completely disengaged, i.e. no torque is transmitted. If the disengagement unit is moved to the left (in this representation), the torque will still not be transmitted until the pressure plate, the clutch linings and the flywheel touch. The contact takes place at a point T, which is here designated as the touch-point. If the disengagement unit is displaced firer to the left, the torque transmitted increases linearly, as may be seen from the drawing. The torque transmitted by the clutch produces an acceleration of the vehicle. A uniformly strong or weak acceleration will not normally be experienced as uncomfortable. What is actually experienced as being uncomfortable is a strongly varying acceleration, i.e. an acceleration jolt.

A typical situation in which a jolt can occur is driving away from rest. If the throttle butterfly is actuated, the clutch has to deal, with a very short time delay, with a torque transmission to the engine in order to prevent the engine accelerating too strongly. This means that the disengagement unit must be moved as rapidly as possible from the position a into the position T. If the same rapid movement of the disengagement unit was retained after it had passed the point T, a noisy and uncomfortable jolt would occur. The displacement speed of the disengagement unit must therefore be reduced immediately before reaching the point T to a value which is tolerable with respect to the jolt behaviour. For comfortable driving, therefore, it is of the greatest importance to have a knowledge of the touch-point "T" which is accurate and is always completely brought up to date.

In the case of a conventional manual gearbox, the position of the disengagement unit is directly controlled with the clutch pedal by the driver by means of a mechanical or hydraulic force transmission system. In the case of an automatic clutch, the position of the disengagement unit is controlled by the actuator. In both cases, accurate knowledge of the touch-point T is decisive for comfortable driving. In the case of a conventional gear-change motor vehicle, the driver obtains this knowledge from experience. In the case of an automatically actuated clutch, the touch-point T must be measured, either directly or indirectly. In accordance with the invention, this is essentially achieved by means of two closed-loop control circuits, as already explained. These are an inner or subordinate closed-loop control circuit which controls the position of the actuator to a required value and an outer closed-loop control circuit which specifies this required value. The outer closed-loop control circuit controls the engine speed to a required value which is the result of the current driving conditions. The effect of the control can be explained by means of the following three steps but it should be noted that this only applies if slip is present in the clutch.

1. If the superimposed control circuit recognizes the fact that the engine speed is above the required value, this can only be due to the clutch transmitting too little torque. The superimposed control circuit therefore changes the required value for the control of the clutch position, i.e. for the subordinate or inner control circuit—which signifies a displacement to the left in FIG. 7. By this means, more torque which retards the engine is transmitted, so that the engine speed is reduced in the direction of the required value.
2. If the superimposed control circuit recognizes that the engine speed is below the required value, this must be due to the clutch transmitting too much torque. In consequence, the superimposed control circuit changes the required value for the clutch position, i.e. for the subordinate control circuit—which corresponds to a displacement to the right in FIG. 7. In consequence, less braking torque is transmitted to the engine so that the engine speed increases in the direction of the required value.
3. If the superimposed control circuit recognizes no essential difference between the engine speed and its required value, the required position value for the clutch actuator is not changed.

In other words, the clutch actuator continually strives towards a position or attitude in which a braking torque is transmitted to the engine which agrees exactly with the torque generated by the engine. This fact is of importance to the extent that when there is a mode in which the same torque is transmitted, each time, then, when this mode is active, the clutch actuator is adjusted each time to the same relative position of the touch-point T. This provides a method of calibrating the touch point.

On this point, reference should be made to the lower curve of FIG. 7. The lower limit of the torque range which can be generated by the engine occurs in an operating condition in which the throttle butterfly is closed and the engine torque is negative, i.e. in the overrun cut-off condition in which the engine is retarding the vehicle (or the vehicle is "pushing" the engine). In vehicles with advanced engine control, the fuel supply is interrupted in this condition—at least above a specified speed value.

Assuming that the braking torque, which is caused by internal friction and damping in the engine, does not depend too greatly on other parameters (for example on temperature), this mode can be used in order to obtain a measurement for the touch-point T with the deviation mentioned. The difference consists only in the fact that in this case it is realized with a negative torque instead of a positive torque.

In order to carry out the measurement, the control system activates the two closed-loop control circuits previously mentioned each time the throttle butterfly angle is zero and the engine acts as a brake. At this instant, the required value for the engine speed takes up a specified value, for example 50 rpm below the speed of the input shaft of the gearbox. The actuator for the clutch actuation is then caused to regulate the position of the clutch so that the torque transmitted through it agrees exactly with the braking torque of the engine. The regulated position of the actuator 8 is measured at each overrun cut-off and the measurement is low-pass filtered and stored. A control deviation of the filtered measurement taken from the torque diagram of the engine as a function of the respective engine speed gives the calibration value for the touch-point T.

The deviation or the "delta" value for a certain motor vehicle type is determined and fixed by test on a first example of this type.

By this method, compensation is automatically provided for displacements of the touch-point which are caused by clutch wear. If the wear reaches a specified limiting value, a warning signal can be transmitted to the driver by means of the warning lamp 23 (FIG. 1) and this should cause him to renew the clutch linings.

Figure 8:
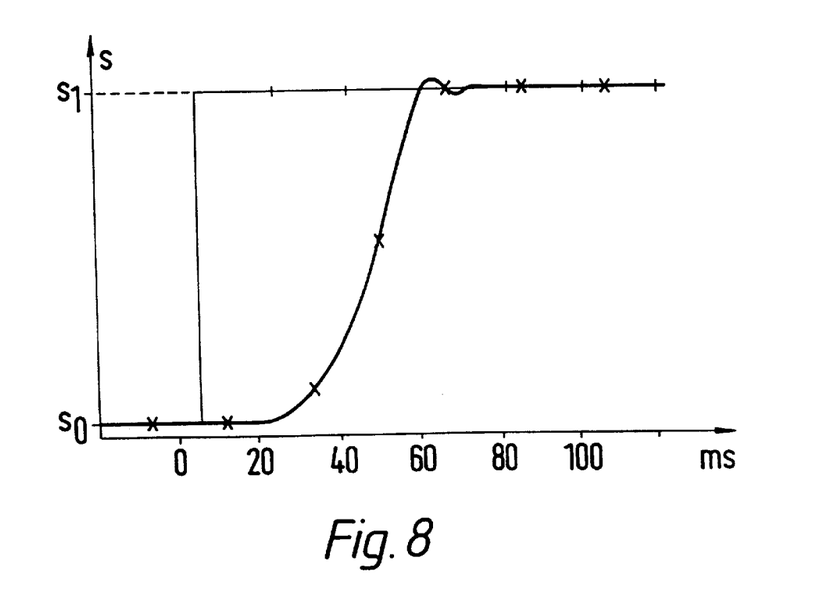
FIG. 8 shows an actuator motion of a clutch control system as shown in FIG. 1, in the form of a measurement diagram.

A measurement diagram of a clutch actuation carried out with the control system described here may be seen in FIG. 8. The upper horizontal line corresponds to the disengaged position $s_1$ and the lower horizontal line corresponds to the engaged position $s_0$ of the clutch. The left-hand, approximately vertical line gives the instant at which the required value (set point) for the clutch disengagement is generated whereas the right-hand curve reproduces the disengagement motion of the clutch (clutch position).

If the driver changes gear, the disengagement procedure must take place sufficiently rapidly for the clutch to be completely disengaged in every case before the next gear is engaged and, specifically, independently of how rapidly the driver moves the gear lever. The curve represented shows that the clutch is completely disengaged within 60 to 70 ms after the required value changes from the "engaged" position into the "disengaged" position. Taking account of the scanning times in the control system, this means that the clutch is completely disengaged approximately 70 ms after the driver begins to move the gear lever. It has been established by driving tests that this time is sufficient even if the gear lever is moved as fast as it possibly can be.

I claim:

1. A control system in an automatically actuated clutch which is arranged between an engine and a gearbox of a motor vehicle and which is moved by an actuator displacing a disengagement unit from a fully disengaged position, via positions in which slip occurs, into a fully engaged position, wherein a touch-point of the clutch at which engine torque starts to be transmitted is determined and an axial position of the actuator at this touch-point is stored, wherein in the range above the touch-point, in which no torque is transmitted, the position of the actuator is controlled by a closed-loop position control circuit; and in the range below the touch-point, in which torque is transmitted, said closed-loop position control circuit is subordinate to an engine speed control circuit for the motor.

2. A control system according to claim 1, wherein the engine speed at the touch-point is regulated by the engine speed control circuit to a value, which lies above the speed of an input shaft of the gearbox and that the difference between the engine speed and input shaft speed varies depending on whether the vehicle is being started from rest, a gear change is taking place or the engine is being driven with slip.

3. A control system according to claim 1, wherein the engine is used to brake the vehicle, the engine speed at the touch-point is controlled by a speed control circuit to a speed that is below the speed of a clutch output shaft.

4. A control system according to claim 1, wherein the engine is used to brake the vehicle at an engine speed a specified difference below the speed of the input shaft of the gearbox, the position of the actuator is controlled by said closed-loop position control circuit so that the torque transmitted by the clutch is equal to the torque of the engine acting as a brake.

5. A control system according to claim 2, wherein the speed difference is approximately 50 rpm.

6. A control system according to claim 1, wherein the position of the actuator at the touch-point is measured and the measurement value is lowpass filtered and stored.

7. A control system according to claim 6, wherein a calibration value for the touch-point is determined by adding a control deviation value to the filtered measurement value, the control deviation value being derived from the torque diagram of the engine as a function of the respective engine speed.

8. A control system according to claim 1, wherein the position control circuit includes an electric current control circuit.

* * * * *